(12) United States Patent
Kim et al.

(10) Patent No.: US 11,122,543 B2
(45) Date of Patent: Sep. 14, 2021

(54) METHOD FOR PERFORMING SIDELINK COMMUNICATION IN WIRELESS COMMUNICATION SYSTEM AND APPARATUS THEREFOR

(71) Applicant: LG ELECTRONICS INC., Seoul (KR)

(72) Inventors: Myoungseob Kim, Seoul (KR); Hanbyul Seo, Seoul (KR); Seungmin Lee, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 116 days.

(21) Appl. No.: 16/492,086

(22) PCT Filed: Mar. 7, 2018

(86) PCT No.: PCT/KR2018/002699
§ 371 (c)(1),
(2) Date: Sep. 6, 2019

(87) PCT Pub. No.: WO2018/164476
PCT Pub. Date: Sep. 13, 2018

(65) Prior Publication Data
US 2021/0136730 A1 May 6, 2021

Related U.S. Application Data

(60) Provisional application No. 62/468,378, filed on Mar. 8, 2017.

(51) Int. Cl.
*H04W 72/02* (2009.01)
*H04W 24/10* (2009.01)
(Continued)

(52) U.S. Cl.
CPC ........... *H04W 72/02* (2013.01); *H04W 24/10* (2013.01); *H04W 72/0446* (2013.01); *H04W 72/08* (2013.01); *H04W 92/18* (2013.01)

(58) Field of Classification Search
CPC . H04W 72/02; H04W 72/08; H04W 72/0446; H04W 24/10
See application file for complete search history.

(56) References Cited

U.S. PATENT DOCUMENTS

2013/0322413 A1 12/2013 Pelletier et al.
2015/0319655 A1* 11/2015 Koskinen .......... H04W 36/0094
370/331
(Continued)

FOREIGN PATENT DOCUMENTS

AU 2015300962 3/2017
KR 20160143561 12/2016
(Continued)

OTHER PUBLICATIONS

PCT International Application No. PCT/KR2018/002699, International Search Report dated Jun. 20, 2018, 4 pages.
(Continued)

*Primary Examiner* — Jamal Javaid
*Assistant Examiner* — Ryan C Kavleski
(74) *Attorney, Agent, or Firm* — Lee, Hong, Degerman, Kang & Waimey

(57) ABSTRACT

The present invention provides a method for performing a sidelink communication in a wireless communication system and an apparatus therefor. Specifically, the method performed by a first terminal may comprise the steps of: receiving a reference signal from a second terminal; calculating a measurement value by using the received reference signal; determining whether the calculated measurement value is equal to or smaller than a predetermined threshold value, wherein the predetermined threshold value is set using a ratio between a first transmission time interval and a second transmission time interval, which are supported by the first terminal; and when the calculated measurement value is equal to or smaller than the predetermined threshold value, transmitting a signal generated according to the second transmission time interval to the second terminal by using a resource through which the reference signal is received, wherein a length of the second transmission time
(Continued)

interval may be shorter than a length of the first transmission time interval.

10 Claims, 10 Drawing Sheets

(51) Int. Cl.
  *H04W 72/04* (2009.01)
  *H04W 72/08* (2009.01)
  *H04W 92/18* (2009.01)

(56) References Cited

U.S. PATENT DOCUMENTS

| | | | |
|---|---|---|---|
| 2016/0249307 A1* | 8/2016 | Thangarasa | H04W 56/001 |
| 2017/0019886 A1* | 1/2017 | Patel | H04W 8/005 |
| 2019/0174547 A1* | 6/2019 | Khoryaev | H04W 4/46 |
| 2020/0305129 A1* | 9/2020 | Lee | H04W 72/0446 |

FOREIGN PATENT DOCUMENTS

| | | |
|---|---|---|
| KR | 20160146554 | 12/2016 |
| KR | 20170020458 | 2/2017 |
| WO | 2017011079 | 1/2017 |

OTHER PUBLICATIONS

Samsung, "Coexistence between legacy TTI and sTTI operations for DL/UL," 3GPP TSG-RAN WG1 #87, R1-1612405, Nov. 2016, 6 pages.

European Patent Office Application Serial No. 18763639.4, Search Report dated Dec. 11, 2020, 7 pages.

Korean Intellectual Property Office Application Serial No. 10-2019-7026335, Korean Notice of Allowance dated Feb. 17, 2021, 2 pages.

* cited by examiner

[FIG. 1]
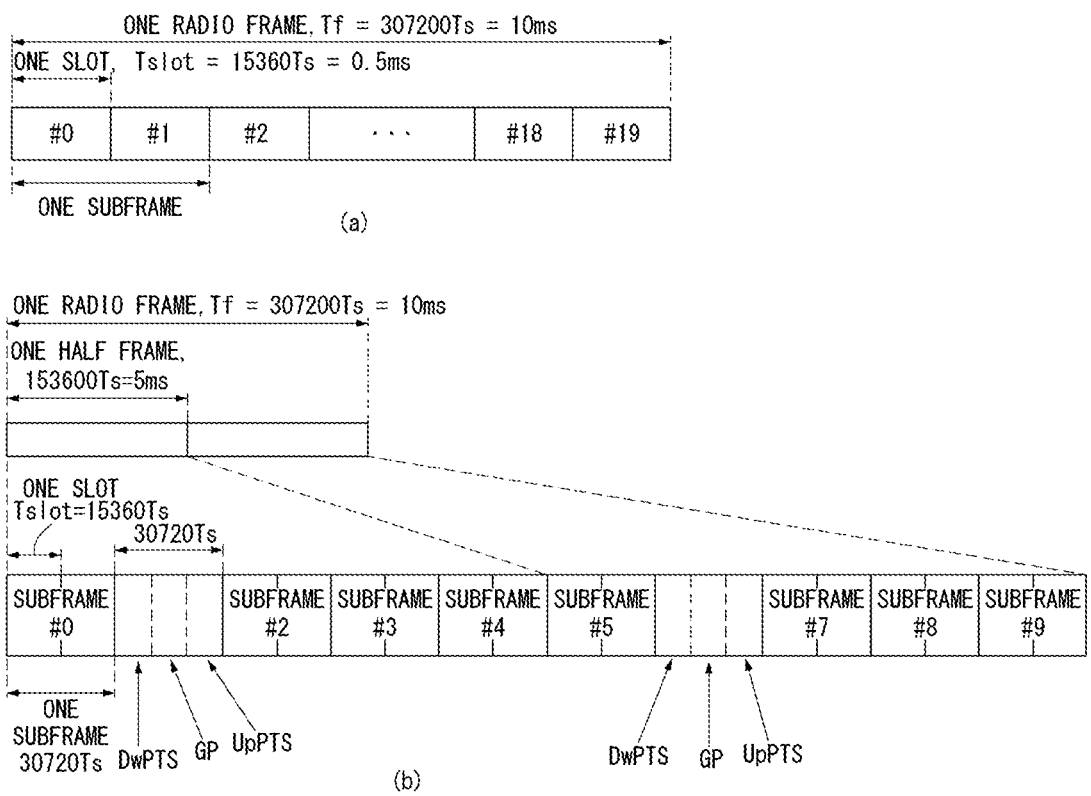

[FIG. 2]
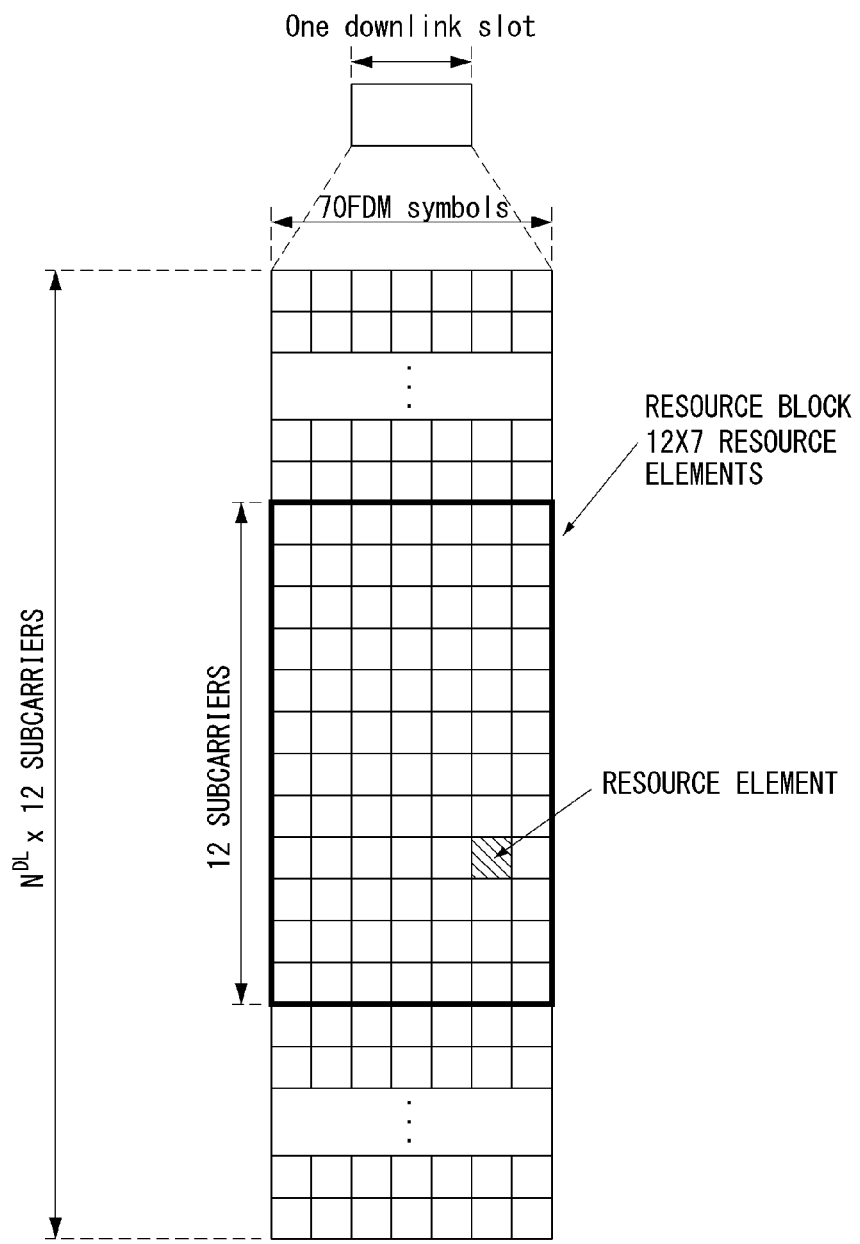

[FIG. 3]
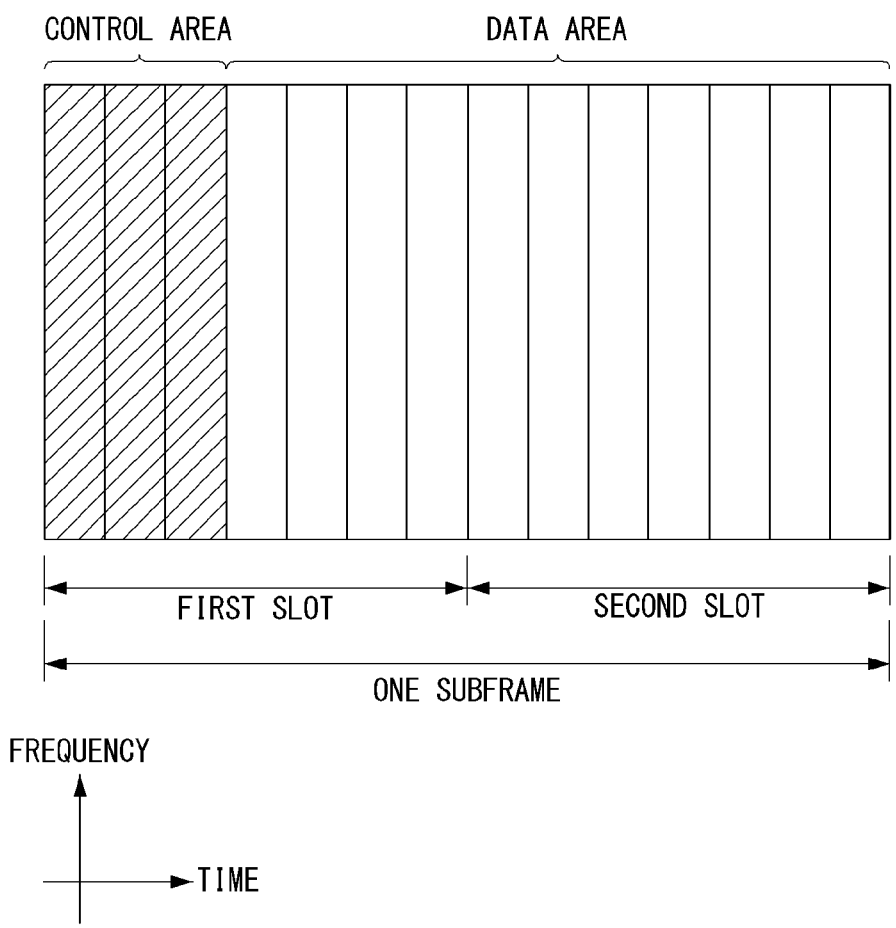

[FIG. 4]
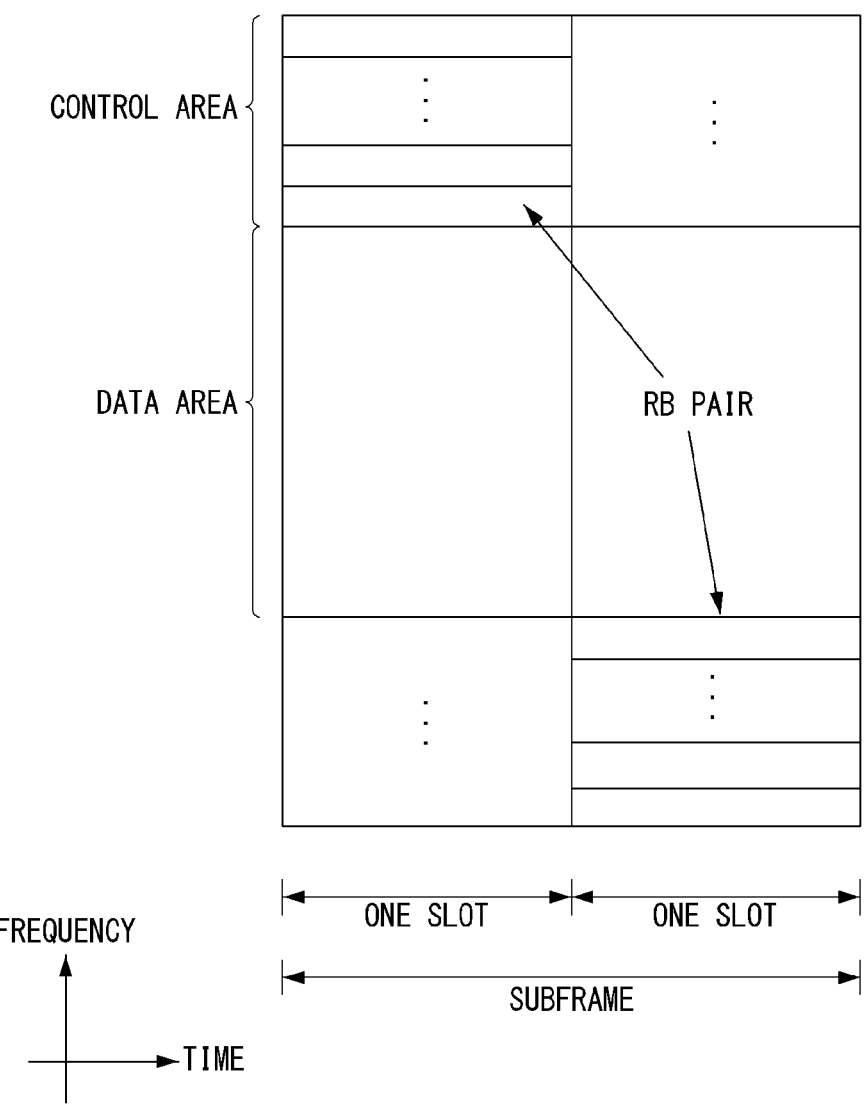

[FIG. 5]
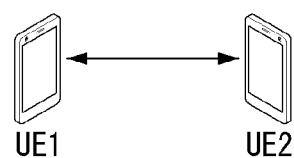

[FIG. 6]
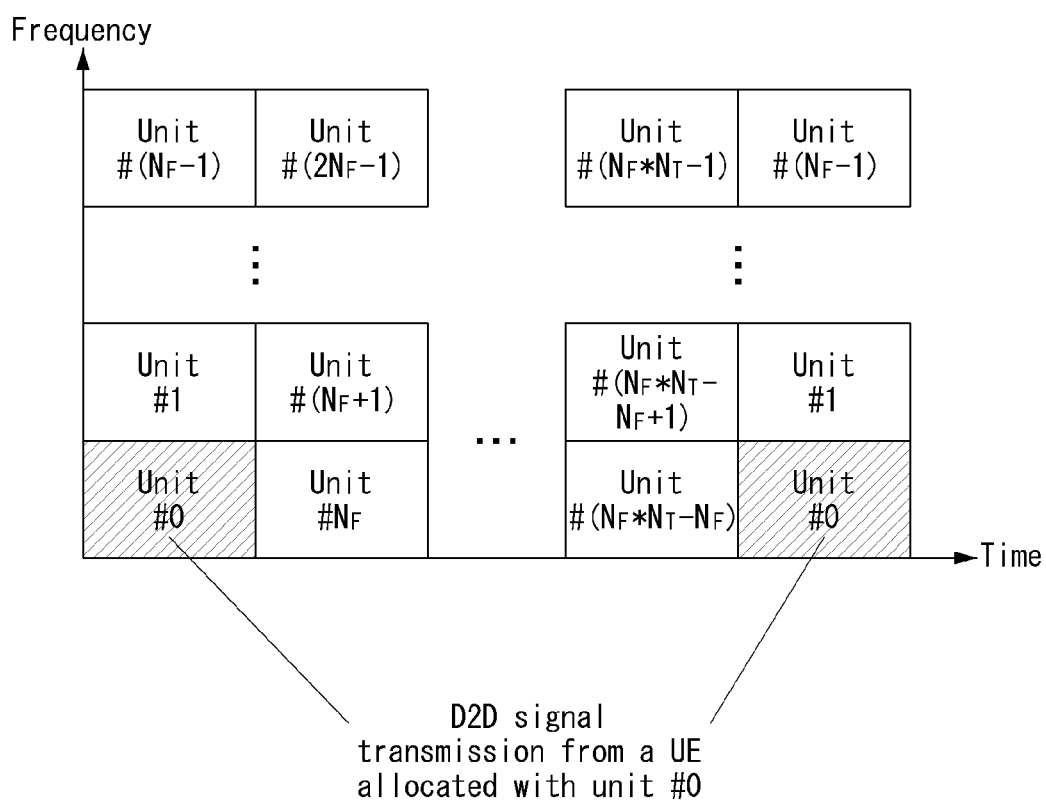

[FIG. 7]
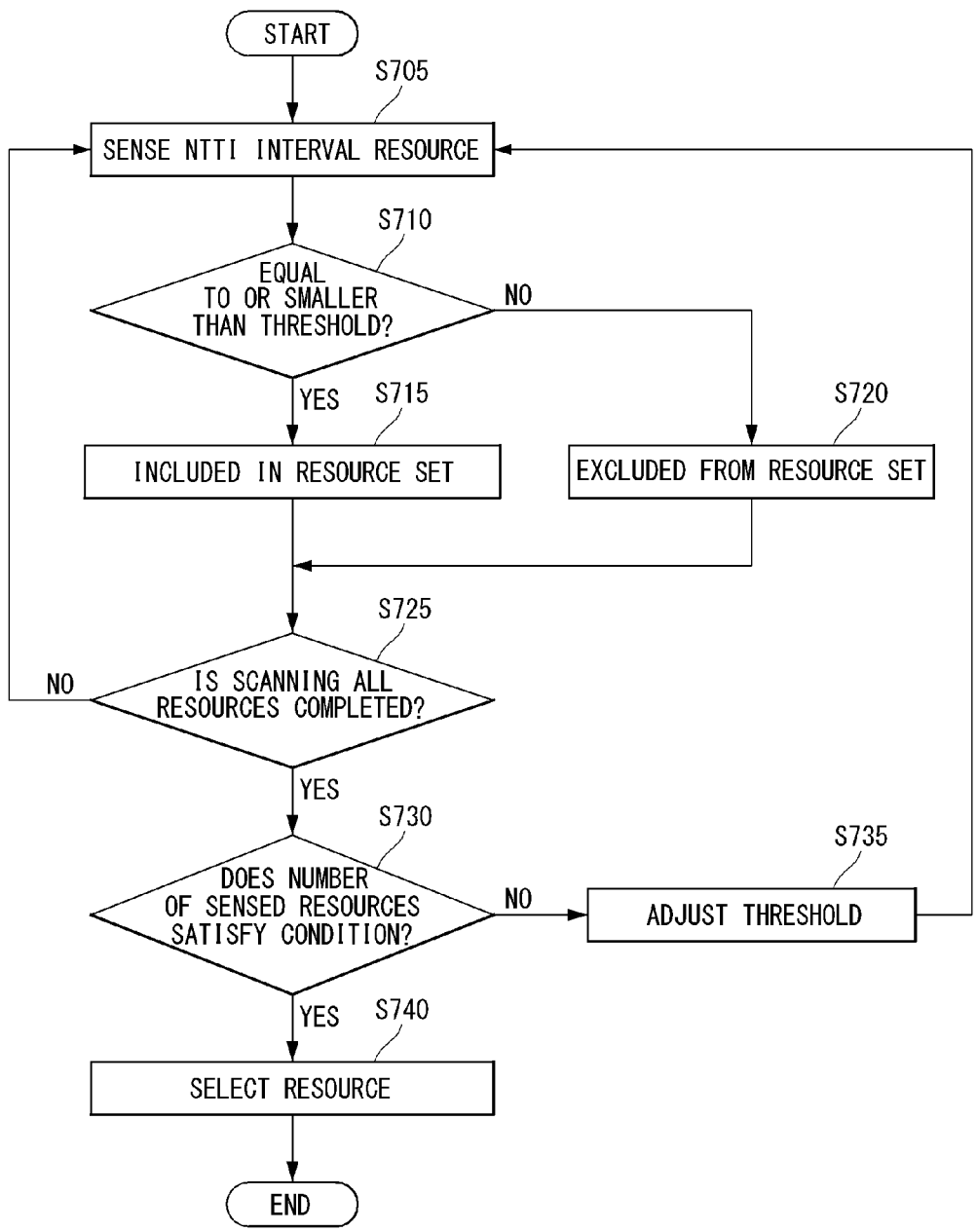

[FIG. 8]
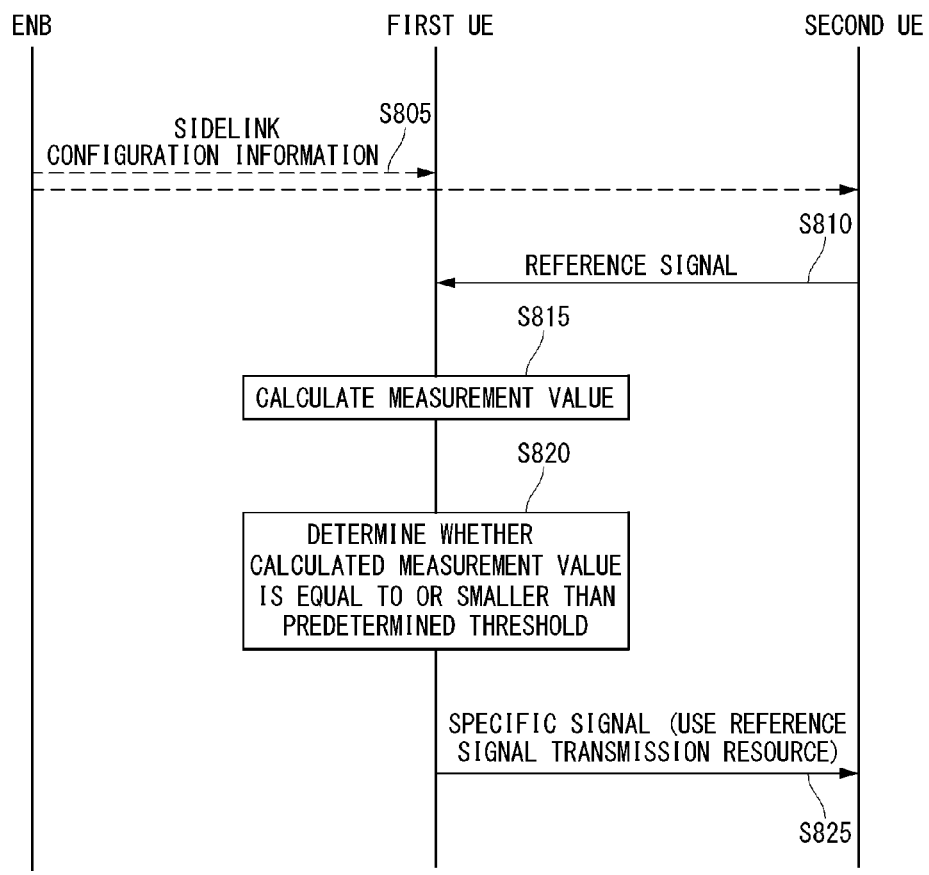

[FIG. 9]
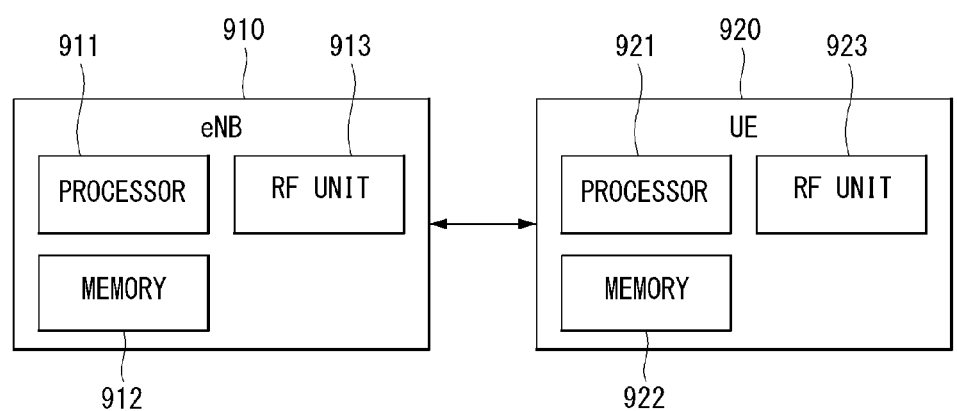

[FIG. 10]
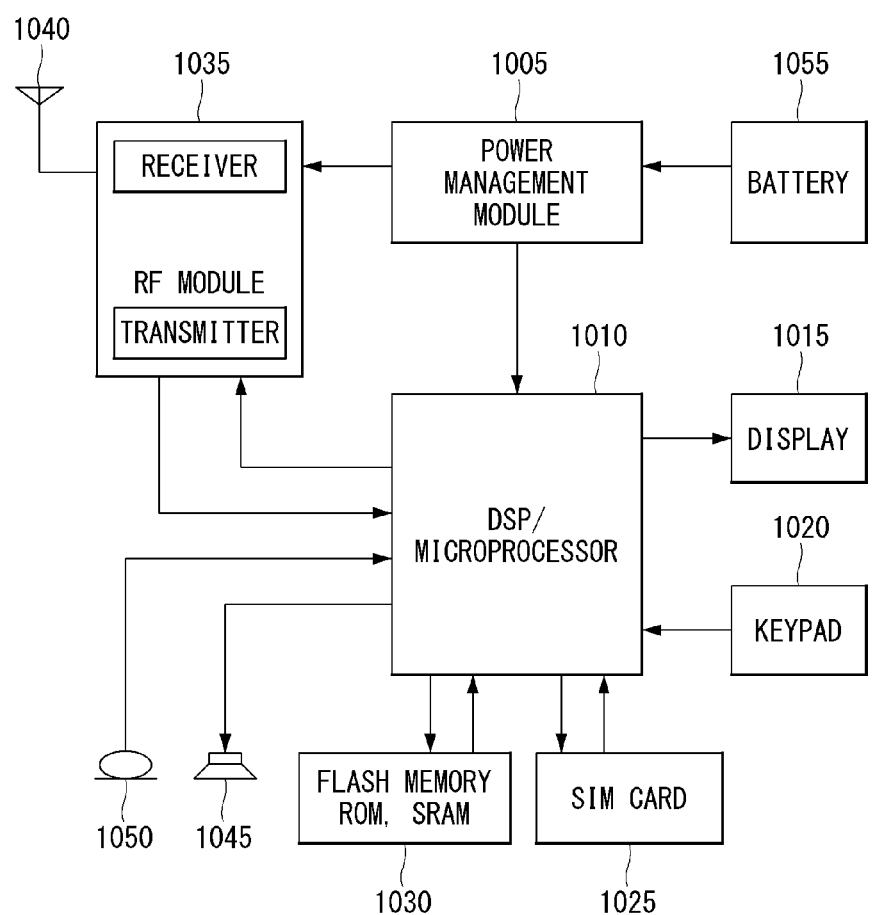

METHOD FOR PERFORMING SIDELINK COMMUNICATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/002699, filed on Mar. 7, 2018, which claims the benefit of U.S. Provisional Application No. 62/468,378, filed on Mar. 8, 2017, the contents of which are all hereby incorporated by reference herein in their entirety.

TECHNICAL FIELD

The present invention relates to a wireless communication system, and more particularly, to a method for performing, by a terminal, sidelink communication in a wireless communication system supporting a short transmission time interval and an apparatus supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

This specification proposes a method for performing, by a terminal, sidelink communication in a wireless communication system supporting a short transmission time interval (sTTI) and an apparatus therefor.

Specifically, this specification proposes a resource selection and transmission method for sTTI packets when existing TTI packets and sTTI packets coexist.

To this end, this specification proposes a method for determining whether to transmit sTTI packets according to a priority.

Furthermore, this specification proposes a method for using a threshold in relation with resource sensing for transmission of nTTI packets and/or sTTI packets.

The technical objects of the present invention are not limited to the aforementioned technical objects, and other technical objects, which are not mentioned above, will be apparently appreciated by a person having ordinary skill in the art from the following description.

Technical Solution

In an aspect, a method for performing, by a first terminal, sidelink communication in a wireless communication system may include: receiving a reference signal from a second terminal; calculating a measurement value by using the received reference signal; determining whether the calculated measurement value is equal to or smaller than a predetermined threshold, wherein the predetermined threshold is set by a ratio between a first transmission time interval and a second transmission time interval supported by the first terminal; and transmitting, to the second terminal, a signal generated according to the second transmission time interval by using a resource through which the reference signal is received when the calculated measurement value is equal to or smaller than the predetermined threshold, in which a length of the second transmission time interval is shorter than the length of the first transmission time interval.

Further, in the method according to the aspect of the present invention, the reference signal may be received by performing monitoring according to the first transmission time interval by the terminal.

Further, in the method according to the aspect of the present invention, the first transmission time interval may be a time interval corresponding to one subframe, and the second transmission time interval may be a time interval shorter than one subframe.

Further, the method according to the aspect of the present invention may further include receiving, from a base station, sidelink configuration information including the preconfigured threshold through higher layer signaling.

Further, in the method according to the aspect of the present invention, the predetermined threshold may be set to a value acquired by subtracting a log value of the ratio between the first transmission time interval and the second transmission time interval from a threshold configured for the second transmission time interval.

Further, in the method according to the aspect of the present invention, when the first transmission time interval is half of the first transmission time interval, the predetermined threshold may be set to be smaller than the threshold configured for the first transmission time interval by 3 dBm.

Further, in the method according to the aspect of the present invention, the reference signal may be received through a physical sidelink control channel.

Further, in the method according to the aspect of the present invention, the measurement value may be at least one of a Reference Signal Strength Indicator (RSSI) or a Reference Signal Received Power (RSRP).

Further, in the method according to the aspect of the present invention, the resource may be included in resource candidates for transmission of the signal.

Further, in the method according to the aspect of the present invention, the number of blind decoding times for receiving the reference signal may be set according to a ratio between the number of terminals of a first terminal group and the number of terminals of the second terminal group in a cell to which the first terminal and the second terminal belong, and the first terminal group and the second terminal group may be classified according to whether the terminal supports the second transmission time interval.

In another aspect, a first terminal performing sidelink communication in a wireless communication system may include: a transceiver for transmitting and receiving a radio signal; and a processor functionally connected to the transceiver, in which the processor may be configured to receive a reference signal from a second terminal, calculate a measurement value by using the received reference signal, determine whether the calculated measurement value is equal to or smaller than a predetermined threshold, wherein the predetermined threshold is set by a ratio between a first transmission time interval and a second transmission time interval supported by the first terminal, and transmit, to the second terminal, a signal generated according to the second transmission time interval by using a resource through which the reference signal is received when the calculated measurement value is equal to or smaller than the predetermined threshold, and a length of the second transmission time interval may be shorter than the length of the first transmission time interval.

Advantageous Effects

According to an embodiment of the present invention, there is an effect of efficiently distinguishing resources occupied by other terminals in a wireless communication system supporting a sidelink set at a short transmission time interval.

Advantages which may be obtained in the present invention are not limited to the aforementioned effects and other unmentioned advantages will be clearly understood by those skilled in the art from the following description.

DESCRIPTION OF DRAWINGS

The accompanying drawings, which are included herein as a part of a description in order to help understanding of the present disclosure, provide embodiments of the present disclosure, and describe the technical features of the present disclosure with the description below.

FIG. 1 shows the structure of a radio frame in a wireless communication system to which an embodiment of the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 is a diagram for illustrating elements for a direct communication (D2D) scheme between UEs.

FIG. 6 is a diagram showing an embodiment of the configuration of a resource unit.

FIG. 7 illustrates one example of a flowchart of a UE operation of selecting a resource in a wireless communication system to which a method proposed in this specification may be applied.

FIG. 8 illustrates a flowchart of an operation of a UE which performs sidelink communication in a wireless communication system to which a method proposed by this specification may be applied.

FIG. 9 illustrates a block diagram of a wireless communication device to which methods proposed by this specification may be applied.

FIG. 10 illustrates a block diagram of a communication device according to an embodiment of the present invention.

MODE FOR INVENTION

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In this specification, a base station has a meaning as a terminal node of a network that directly communicates with a terminal. In this document, a specific operation described as being performed by the base station may be performed by an upper node of the base station in some cases. That is, it is apparent that various operations performed for communication with the terminal in the network constituted by multiple network nodes including the base station may be performed by the base station or network nodes other than the base station. A "base station (BS)" may be replaced with terms including a fixed station, a Node B, an evolved-nodeB (eNB), a base transceiver system (BTS), an access point (AP), a next generation NB, general NB, gNodeB (gNB), and the like. Further, a "terminal" may be fixed or mobile and may be replaced with terms including a mobile station (UE), a mobile station (MS), a user terminal (UT), a mobile subscriber station (MSS), a subscriber station (SS) advanced mobile station (WT), a wireless terminal (WT), a machine-type communication (MTC) device, a machine-to-machine (M2M) device, and a device-to-device (D2D) device, and the like.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical spirit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA).

UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/New RAT(NR) is chiefly described, but the technical characteristics of the present disclosure are not limited thereto.

General System

FIG. 1 shows the structure of a radio frame in a wireless communication system to which an embodiment of the present invention may be applied.

In 3GPP LTE/LTE-A, radio frame structure type 1 may be applied to frequency division duplex (FDD) and radio frame structure type 2 may be applied to time division duplex (TDD) are supported.

In FIG. 1, the size of the radio frame in the time domain is represented by a multiple of a time unit of $T\_s=1/(15000*2048)$. The downlink and uplink transmissions are composed of radio frames having intervals of $T\_f=307200*T\_s=10$ ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of $T\_slot=15360*T\_s=0.5$ ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous sub-carriers in one slot.

FIG. 1(b) illustrates the type 2 radio frame structure.

The type 2 radio frame structure includes 2 half frames each having a length of $153600*T\_s=5$ ms. Each of the half frames includes 5 subframes each having a length of $30720*T\_s=1$ ms.

In the type 2 radio frame structure of a TDD system, an uplink-downlink configuration is a rule showing how uplink and downlink are allocated (or reserved) with respect to all of subframes.

Table 1 represents the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "$T\_slot=15360*T\_s=0.5$ ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 represents a configuration (i.e., the length of a DwPTS/GP/UpPTS) of the special subframe.

TABLE 2

| | | Normal cyclic prefix in downlink | | Extended cyclic prefix in downlink | | |
|---|---|---|---|---|---|---|
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Enhanced PDCCH (EPDCCH) carries UE-specific signaling. The EPDCCH is located in a physical resource block (PRB) that is set to be terminal specific. In other words, as described above, the PDCCH can be transmitted in up to three OFDM symbols in the first slot in the subframe, but the EPDCCH can be transmitted in a resource region other than the PDCCH. The time (i.e., symbol) at which the EPDCCH in the subframe starts may be set in the UE through higher layer signaling (e.g., RRC signaling, etc.).

The EPDCCH is a transport format, a resource allocation and HARQ information associated with the DL-SCH and a transport format, a resource allocation and HARQ information associated with the UL-SCH, and resource allocation information associated with SL-SCH (Sidelink Shared Channel) and PSCCH Information, and so on. Multiple EPDCCHs may be supported and the terminal may monitor the set of EPCCHs.

The EPDCCH can be transmitted using one or more successive advanced CCEs (ECCEs), and the number of ECCEs per EPDCCH can be determined for each EPDCCH format.

Each ECCE may be composed of a plurality of enhanced resource element groups (EREGs). EREG is used to define the mapping of ECCE to RE. There are 16 EREGs per PRB pair. All REs are numbered from 0 to 15 in the order in which the frequency increases, except for the RE that carries the DMRS in each PRB pair.

The UE can monitor a plurality of EPDCCHs. For example, one or two EPDCCH sets may be set in one PRB pair in which the terminal monitors the EPDCCH transmission.

Different coding rates can be realized for the EPCCH by merging different numbers of ECCEs. The EPCCH may use localized transmission or distributed transmission, which may result in different mapping of the ECCE to the REs in the PRB.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH is frequency-hopped in a slot boundary.

Device-To-Device (D2D) Communication

FIG. 5 is a diagram for illustrating elements for a direct communication (D2D) scheme between UEs.

In FIG. 5, a UE means the terminal of a user. If network equipment, such as an eNB, transmits/receives a signal according to a communication method with a UE, the corresponding network equipment may also be considered as a kind of UE. Hereinafter, a UE1 may operate to select a resource unit corresponding to a specific resource within a resource pool that means a set of a series of resources and to transmit a D2D signal using the corresponding resource unit. A UE2, that is, a reception UE corresponding to the UE1, is configured with a resource pool in which the UE1 may transmit a signal, and detects the signal of the UE1 within the corresponding pool. In this case, the resource pool may be notified by a base station if the UE1 is within the coverage of the base station and may be notified by another UE or may be determined as a predetermined resource if the UE1 is out of the coverage of the base station. In general, a resource pool may include a plurality of resource units. Each UE may select one or a plurality of resource units and use it for its own D2D signal transmission.

FIG. 6 is a diagram showing an embodiment of the configuration of a resource unit.

Referring to FIG. 6, all frequency resources may be divided into N_F, and all time resources may be divided into N_T, so a total of N_F*N_T resource units may be defined. In this case, a corresponding resource pool may be represented as being repeated based on the periodicity of an N_T subframe. Characteristically, one resource unit may appear periodically and repeatedly as shown in this drawing. Alternatively, in order to obtain a diversity effect in a time or frequency dimension, the index of a physical resource unit to which one logical resource unit is mapped may vary in a predetermined pattern over time. In such a resource unit structure, a resource pool may mean a set of resource units which may be used for transmission by a UE that attempts to transmit a D2D signal.

The above-described resource pool may be subdivided into several types. First, the resource pool may be classified based on the contents of a D2D signal transmitted in each resource pool. For example, the contents of a D2D signal may be classified as follows. A separate resource pool may be configured in each one.

Scheduling assignment (SA): a signal including information, such as the location of a resource used for the transmission of a D2D data channel in following subframe or same subframe, which is used by each transmission UE and a modulation and coding scheme (MCS) or an MIMO transmission method and/or a timing advance necessary for the demodulation of other data channel. The signal may be multiplexed with D2D data and transmitted on the same resource unit. In this specification, an SA resource pool may mean a pool of resources in which SA is multiplexed with D2D data and transmitted, and may be denoted as a D2D control channel.

D2D data channel: a resource pool which is used by a transmission UE to transmit user data using a resource designated through SA. If a resource pool can be multiplexed with D2D data and transmitted on the same resource unit, only a D2D data channel of a form other than SA information may be transmitted in a resource pool for the D2D data channel. In other words, a resource element used to transmit SA information on each resource unit within an SA resource pool may be still used to transmit D2D data in a D2D data channel resource pool.

Discovery channel: a resource pool for a message that enables a transmission UE to be discovered by an adjacent UE by transmitting information, such as its own ID.

On the contrary, although the contents of a D2D signal are the same, a different resource pool may be used depending on the transmission/reception attributes of the D2D signal. For example, although a D2D data channel or a discovery message is the same, it may be classified as a different resource pool depending on a transmission timing determination method (e.g., it is transmitted in the reception timing of a sync reference signal or transmitted in corresponding timing by applying a given timing advance) or a resource allocation method (e.g., an eNB designates the transmission resource of each signal with respect to each transmission UE or each transmission UE autonomously selects each signal transmission resource within a pool) of a D2D signal, a signal format (e.g., number of symbols occupied by each D2D signal in one subframe or the number of subframes used for the transmission of one D2D signal), signal intensity from an eNB, transmission power intensity of a D2D UE, etc.

In this specification, for the sake of description, a method of directly indicating, by an eNB, the transmission resource of a D2D transmission UE in D2D or V2V communication is denoted/defined as Mode 1 or Mode 3, and a method of pre-configuring a transmission resource region or designating, by an eNB, a transmission resource region and directly selecting, by a UE, a transmission resource is denoted/defined as Mode 2 or Mode 4. In the case of D2D discovery, if an eNB directly indicates a resource, this is denoted/defined as Type 2. If a resource region is pre-configured or a UE directly selects a transmission resource in a resource region indicated by an eNB, this is denoted/defined as Type 1.

The above-described D2D may be called a sidelink. SA may be called a physical sidelink control channel (PSCCH), a D2D synchronization signal may be called a sidelink synchronization signal (SSS), and a control channel in which the most basic information is transmitted prior to D2D communication transmitted along with an SSS may be called a physical sidelink broadcast channel (PSBCH) or a physical D2D synchronization channel (PD2DSCH) as another name. A signal that is used by a specific UE in order to notify surroundings of its presence. In this case, the signal may include the ID of the specific UE. Such a channel may be called a physical sidelink discovery channel (PSDCH).

In D2D of Rel. 12, only a D2D communication UE has transmitted a PSBCH along with an SSS, and thus the measurement of the SS is performed using the DMRS of the PSBCH. An out-coverage UE measures the DMRS of a PSBCH, and determines whether it may become a synchronization source by measuring reference signal received power (RSRP) of the signal.

In a next generation communication system requiring very low latency, the eNB and/or the UE may transmit control information and/or data using a shorter transmission interval than a transmission interval used in an existing communication system (e.g., a legacy LTE system). Here, the transmission interval may mean a transmission time interval.

In this case, the transmission interval used in the existing communication system may be referred to as a normal TTI (nTTI) or a legacy TTI and the shorter transmission interval may be referred to as a short TTI (sTTI). That is, in the case of the next generation communication system, it may be designed to support nTTI and/or sTTI.

In particular, in the case of a vehicle communication system such as vehicle-to-everything (V2X) that requires a fast response speed, it is necessary to reduce the transmission latency of messages related to the safety of the vehicle and a driver and to transmit the messages quickly. Accordingly, the next generation communication system supporting the V2X communication may consider introducing the sTTI as described above.

However, a case in which all vehicle UEs (i.e., a UE mounted in the vehicle or a UE in the form of the vehicle) or driver UEs may not support the next generation communication system may occur. That is, a legacy UE and an advanced UE may be mixed and present in one system.

In this case, the UE may be classified into a type (or category) according to whether the sTTI may be supported. For example, a transmission interval (e.g., 1 ms) used in the existing communication system may be referred to as TTI type A, and a shorter transmission interval (e.g., 0.5 ms) may be referred to as TTI type B. In this case, the UE may be classified into a UE corresponding to TTI type A and a UE corresponding to TTI type B.

The UE corresponding to TTI type A may be configured to perform an operation such as resource sensing, etc., by performing measurement per 1 ms in order to find a resource through which the control information and/or data is to be transmitted. In this case, even though an interval of 0.5 ms in a specific 1 ms interval is occupied by the UE(s) corresponding to TTI type B, the corresponding UE may recognize that the entirety of the corresponding 1 ms interval is in use.

For example, it may be assumed that when a reception power (e.g., a Reference Signal Received Power (RSRP)) of a specific resource is equal to or lower than X dBm, the UE may recognize (or identify) the corresponding resource as a candidate resource which may be used for data transmission. When received power of the signal transmitted by the UE corresponding to TTI type B in the specific resource is higher than (X+3) dBm for 0.5 ms, received power (i.e., an overall RSRP) for 1 ms in the corresponding resource is higher than X dBm.

In addition, since the UE(s) corresponding to TTI type B have the short TTI interval, data may be more frequently transmitted when it is assumed that the UE corresponding to TTI type B has the same average power consumption (e.g., average power consumption per hour) as the UE corresponding to TTI type A. In this case, a case where the UE corresponding to TTI type A may not perform resource selection may frequently occur.

On the contrary, when the received power of the signal transmitted by the UE corresponding to TTI type B in the specific resource is lower than (X+3) dBm for 0.5 ms, the UE corresponding to TTI type B may interfere with the UE corresponding to TTI type A. In this case, the interference may occur at least during the interval of 0.5 ms. In spite of the interference, the UE corresponding to TTI type A may be select the corresponding resource for data transmission.

Therefore, it is necessary to prevent the operation(s) as described above to occur for the efficiency of resource selection of the UE. To this end, it is necessary to define a rule related to allocation and transmission of the sTTI packet so that a packet (hereinafter, referred to as nTTI packet) configured as an existing transmission interval and a packet (hereinafter, referred to as sTTI packet) configured as the short transmission interval may coexist. Here, the packet may mean a container or transmission unit to the transmit the signal, the data, and/or information (e.g., control information).

Hereinafter, in this specification, a method for determining whether to transmit the sTTI packet according to the priority and a method for sensing the resource for transmission of the sTTI packet, when the UE needs to transmit and receive the sTTI packet will be described in detail.

First Embodiment—Method for Determining Whether to Transmit sTTI Packet According to Priority As described above, the transmission of the sTTI packet may affect the transmission of the nTTI packet. In order to prevent the affect, a method for reducing a transmission frequency of the sTTI packet or lowering the priority of the transmission of the sTTI packet may be considered.

Here, the priority may be configured in the form of a packet transmission priority (i.e., Per Packet Prose Priority (PPPP)) used in a V2X or enhanced V2X system. When transmitting data, the transmission scheme of the sTTI packet may be configured differently according to a latency from the viewpoint of a specific UE and/or system, an occupancy degree (i.e., whether there are available resources) of transmission resources, and the like. In particular, a requirement such as the latency may be expressed as a PPPP value.

Therefore, determining the transmission priority based on such a parameter may be advantageous for guaranteeing the quality of service (QoS) of traffic. In other words, if different types of traffic (e.g., sTTI packet and nTTI packet) is processed by a scheme of increasing the transmission priority higher-priority traffic and lowering the transmission priority of lower-priority traffic, an influence on the entire QoS may be minimized.

In particular, when sTTI transmission and nTTI transmission may occur at the same time, there is an effect to reduce in-band interference through such a scheme.

In addition, in order to prevent another UE from being affected by interference due to undesired sTTI traffic (that is, sTTI packet), sTTI transmission may be restricted. Here, the restriction may mean a restriction based on a priority value. In this case, the UE that may not perform sTTI transmission and/or demodulation may be more vulnerable to the influence of interference caused by sTTI traffic because the UE may not accurately demodulate the data transmitted through the sTTI or accurately measure a signal quality.

For example, it may be assumed that a specific UE generates both the nTTI packet and the sTTI packet. That is, both a packet to be transmitted according to the nTTI by the UE and a packet to be transmitted according to the sTTI may occur.

In this case, a method may be considered, which configures the transmission of the sTTI packet to be prioritized according to the priority value set in the sTTI packet when the transmission of the nTTI packet overlaps with the transmission of the sTTI packet (for example, when both transmission overlap with each other on a time axis, that is, in a subframe).

Specifically, the UE may be configured to prioritize the transmission of the sTTI packet when the PPPP value of the sTTI packet is higher than a predetermined PPPP threshold. When as the PPPP value, 0 to 7 are present and when the PPPP threshold is set to 3, the UE may be allowed to perform the transmission of the sTTI packet corresponding to the PPPP value of 0 to 3. Here, a low PPPP value may mean that the transmission of the sTTI packet corresponds to a high transmission priority.

Alternatively, a method may also be considered, which configures the UE to combine two types of packets in the upper layer and then transmit the combined packet as a specific TTI type when the sTTI packet and the nTTI packet overlap at the same transmission time point (or subframe). For example, the UE may concatenate the sTTI packet and the nTTI packet and transmit the concatenated packets through sTTI or nTTI.

Similarly to the above description, a throughput of data may also be one of QoS requirements in terms of the UE and/or the system. In this case, since the interference such as in-band interference may not be large in an environment in which the density of the UE is not large, that is, sufficient resources are available, the SINR value may be guaranteed to be a predetermined value or more.

Therefore, it may be more efficient for the UE to combine the sTTI packet and the nTTI packet and transmit the combined sTTI packet and the nTTI packet than to overlap and transmit the sTTI packet and the nTTI packet in the same resource or separately transmit the sTTI packet or the nTTI packet in different resources. In other words, transmitting the combined packets without dropping may enhance the throughput in terms of the UE and/or the system.

As described above, when different types of packets are combined, the PPPP value of the combined packet may follow a PPPP value of a specific TTI type (e.g., sTTI or nTTI). Alternatively, in order to increase the transmission priority of the combined packet, a maximum value (i.e., a value having a high set priority) among the PPPP values corresponding to two types of combined packets may be set as the PPPP value of the combined packet.

Alternatively, if it is determined that transmitting both types of packets may cause data traffic congestion, a minimum value of the PPPP values corresponding to the two types of packets (i.e., a value having a low set priority) among the PPPP values corresponding to two types of packets may be set as the PPPP value of the combined packet.

For example, the PPPP value of the combined packet may be determined according to a congestion level (e.g., a channel busy ratio (CBR)) value, etc. Specifically, after measuring the CBR value, when the measured value is equal to or smaller than a predetermined threshold, the PPPP value of the combined packet may be determined as a maximum value of two types of PPPP values. In contrast, when the measured value is larger than the predetermined threshold, the PPPP value of the combined packet may be determined as a minimum value of two types of PPPP values. That is, when the congestion level is small, the transmission priority of the corresponding packet may be increased and when the congestion level is large, the transmission priority of the corresponding packet may be decreased.

In this case, the threshold (i.e., the predetermined threshold) for the CBR value may be predefined in the system, semi-statically determined through higher layer signaling, or signaled through a physical channel.

The PPPP value determined through the above-described procedure may be indicated through an SA channel (i.e., sidelink control information (SCI)) indicating data transmission of two types of packets combined.

Alternatively, unlike the case where the UE generates both the sTTI packet and the nTTI packet, the case where the specific UE generates only the sTTI packet may also be considered. In this case, in order to reduce the influence of the transmission of the sTTI packet generated by a specific UE on the transmission of the nTTI packet generated by another UE, whether to transmit the sTTI packet may be determined by the PPPP value.

When the PPPP value set for the corresponding sTTI packet is higher than the preset PPPP threshold, transmission of the sTTI packet may be prioritized. That is, corresponding UE compares the PPPP value set for the corresponding sTTI packet with the preset PPPP threshold to determine the priority of the transmission of the sTTI packet.

As an example, when as the PPPP value, 0 to 7 are present and when the PPPP threshold is set to 3, the UE may be allowed to perform the transmission of the sTTI packet corresponding to the PPPP value of 0 to 3. Here, a low PPPP value may mean that the transmission of the sTTI packet corresponds to a high transmission priority.

Alternatively, when the specific UE receives a PPPP value that is lower than a predetermined PPPP threshold, the UE may select whether to transmit or whether not to transmit the packet through the nTTI.

In addition, the methods described above have been described based on the case where two TTI types (i.e., nTTI and sTTI) exist. However, this is merely for convenience of description, and the above-described methods may be applied to the same manner or similarly when the UE generates packets corresponding to various TTI types. For example, the methods may be similarly applied even to a packet corresponding to nTTI constituted by 14 symbols, a packet corresponding to a first sTTI constituted by 3 symbols, and a packet corresponding to a second sTTI constituted by 2 symbols overlap with each other.

Second Embodiment—Method for Sensing Resource through which Data is to be Transmitted When the UE autonomously selects a resource for transmitting data (and/or signal or information) through resource sensing, the UE may identify a resource through which data of another UE is to be actually transmitted through SA decoding of another UE.

In this case, it may be assumed that a UE (that is, an advanced UE capable of transmitting the sTTI packet) supporting the sTTI may decode a Physical Sidelink Control Channel (PSCCH) transmitted through the nTTI.

Hereinafter, a method for determining the number of demodulations for each of the nTTI and the sTTI and a method for selecting the resource using the threshold with respect to resource sensing of the UE will be described in detail.

Method for Determining Numbers of Demodulations for nTTI and sTTI

The UE may not demodulate the PSCCH infinitely at specific time(subframe) and have a burden to perform blind decoding (BD) in order to determine whether data of another type other than data type to transmit to be transmitted.

Therefore, it may be necessary to determine a degree (e.g., the number of demodulations) of demodulating the PSCCH corresponding to the nTTI by the UE supporting the sTTI.

In this regard, a method for determining the number of demodulations of the PSCCH corresponding to the nTTI may be considered according to the ratio of the UE supporting the sTTI and the UE (that is, a UE capable of transmitting only the nTTI packet) not supporting the sTTI.

For example, the number of demodulations may be determined at a network end (e.g., eNB end). The network may determine the number (e.g., ns) of UEs (i.e., UEs with an sTTI transmission capability) that support the sTTI and the number (i.e., nn) of UEs (i.e. UEs with nTTI only transmission capability) that do not support the sTTI.

In this case, when the UE supporting the sTTI is configured to demodulate the sTTI nBD_s times (when the UE demodulates only the sTTI), the network (i.e., the eNB) may instruct the UE to demodulate the nTTI ceil(nBD_s*(nn/ns)) times. Here, ceil(x) may mean a ceiling function. In this case, the total number of BDs may increase according to additional decoding for nTTI.

Unlike this, in order to maintain the total number of BDs, the network may instruct the UE to demodulate the sTTI ceil (nBD_s*(ns/(ns+nn)) times among the total number of nBD_s demodulations and demodulate the nTTI ceil($n_{BD\_s}$* ($n_n$/($n_s$+$n_n$))) times.

As another example, the UE supporting the sTTI receives $n_n$ and $n_s$ from the network to directly determine the number of demodulations described above or directly estimate $n_n$ and $n_s$. Alternatively, the UE supporting the sTTI may perform the above-described operation (i.e., demodulation operation according to the ratio) based on the sTTI packet and the nTTI packet generated in the UE.

The methods described above are described only for the case where two TTI types (i.e., one nTTI type and one sTTI type) coexist. This is merely for convenience of description, and the above-described methods may be applied equally or similarly even when multiple TTI types (e.g., three or more TTI types) coexist.

Method for Selecting Resource By Using Threshold

In addition, the UE may determine whether to exclude the resource from the resource selection through the measurement value in the data region.

Here, the measurement value may correspond to a signal strength value (e.g., a reference signal strength indicator (RSSI), a sidelink (S)-RSSI, a received power value (e.g., RSRP, PSSCH-RSRP), or the like. That is, when an S-RSSI or PSSCH-RSRP value of a predetermined threshold or more is measured, the UE may consider (or determine) that the corresponding resource is occupied by another UE.

In this case, in order to reduce the influence of the UE(s) supporting the sTTI on nTTI packet transmission, the threshold for the RSSI or RSRP measurement value may be further lowered (that is, biased). Therefore, the UE may attempt resource sensing and resource selection for resources that are less affected by interference. That is, as the threshold is lowered, the total number of available resources that are candidates for resource selection may decrease.

For example, when the sTTI is half resource occupancy and/or transmission energy consumption in the time domain compared to the nTTI, the threshold for determining transmission of the sTTI packet may be set to be lower than the threshold for transmission of the nTTI packet by 3 dB. Here, the transmission energy consumption may correspond to the sum of the transmission powers during the corresponding TTI period.

That is, if the sTTI has less resource occupancy and/or transmission energy consumption in the time domain than the nTTI by x dB, the threshold may be set by x dB lower than the threshold for nTTI packet transmission.

Specifically, when the UE(s) supporting the sTTI performs energy measurement during the period corresponding to the nTTI to find the resource for sTTI packet transmission, the UE may a threshold decreased compared with the existing nTTI packet transmission by x dB. Further, in the case where the UE(s) not supporting the sTTI coexists with the UE(s) supporting the sTTI, when the UE(s) supporting the sTTI performs energy measurement during the interval corresponding to the nTTI to find the resource for sTTI packet transmission, the UE may use a threshold decreased compared with the existing nTTI packet transmission by x dB.

For example, thresholds available when the UE supporting sTTI and the UE not supporting the sTTI sense (i.e., scans) the resource may be expressed as shown in Table 3 below.

TABLE 3

| | Transmission packet | | | |
|---|---|---|---|---|
| | sTTI packet | | nTTI packet | |
| | Scan interval | | | |
| | sTTI | nTTI | sTTI | nTTI |
| UE capable of supporting sTTI Threshold setting | a | a-X | N/A | a-X |
| UE incapable of supporting sTTI Threshold setting | N/A | N/A | N/A | a-X |

As shown in Table 3, when the UE supporting the sTTI transmits the sTTI packet, the UE may perform resource scan according to a threshold set to a dBm in the scan interval set to the sTTI. In addition, the UE may perform the resource scan according to a threshold set to a-X dBm in the scan interval set to the nTTI.

On the contrary, the UE (the UE supporting the sTTI and/or the UE supporting the nTT) transmits the nTTI packet may perform the resource scan according to the threshold set to a-X dBm in the scan interval set to the nTTI.

In this case, the x value may be determined by the sum of the transmission powers during the sTTI (or the new TTI). Here, the sum of the transmission powers during the sTTI may be determined according to the interval length of the sTTI.

In general, when the specific UE consumes a dBm of power (i.e., $P_{nTTI}$=a) during the nTTI, power consumed according to the interval length of the sTTI may vary during the sTTI. In this case, the power consumed during the sTTI by the UE may be expressed as shown in Equation 1.

$$P_{sTTI}32\ a-10*\log 10(T_{Leg}/T_{New})\ (\text{dBm}) \quad [\text{Equation 1}]$$

In Equation 1, $T_{Leg}$ may mean an interval length (e.g., 1 ms) of the nTTI, and $T_{New}$ may mean an interval length (e.g., 0.5 ms) of the sTTI. In other words, the value adjusted for the threshold may be determined according to the ratio between the lengths of the TTIs.

Therefore, x mentioned above may be expressed as '$10*\log 10(T_{Leg}/T_{New})$'.

In addition, the UE (i.e., a UE that is not capable of transmitting the sTTI packet) not supporting the sTTI may determine the existence of the sTTI packet based on the received energy (e.g., S-RSSI). On the other hand, the UE supporting the sTTI (i.e., a UE capable of transmitting the sTTI packet) may exclude the occupied resource through decoding of the PSCCH (or PSSCH).

In this case, with respect to the UE supporting the sTTI, a threshold (e.g., a PSSCH-RSRP threshold) for the nTTI and a threshold (e.g., a PSSCH-RSRP threshold) for the sTTI may be separately set.

In this case, when the UE supporting the sTTI performs the energy measurement to find the resource for transmitting the nTTI packet, a threshold (i.e., a threshold smaller than a threshold for the nTTI by a predetermined value (e.g., x dBm)) for the sTTI needs to be applied. Unlike this, when the UE supporting the sTTI performs energy measurement to find the resource for transmitting the sTTI packet, the predetermined value need not be applied and the threshold for the nTTI may be used as it is. Here, the predetermined value may be referred to as a bias value.

FIG. 7 illustrates one example of a flowchart of a UE operation of selecting a resource in a wireless communication system to which a method proposed in this specification may be applied. FIG. 7 is just for convenience of the description and does not limit the scope of the present invention.

Referring to FIG. 7, it is assumed that the UEs supporting the sTTI and the nTTI select a resource for transmitting and receiving data (or information, signal, etc.). In addition, the operation described in FIG. 7 may be similarly applied to the UE (i.e., a UE that supports only the nTTI) that does not support the sTTI.

In step S705, the UE may be configured to sense the resource(s) belonging to the interval set to the nTTI. For example, the UE may measure (or calculate) a received power value for each resource during an interval corresponding to the nTTI.

In step S710, the UE may determine whether the measured value (i.e., received power value) in the corresponding resource is equal to or smaller than the threshold (e.g., RSRP threshold). Here, the threshold may be predefined on the system or set by the eNB or the like.

When the measured value is equal to or smaller than the threshold, in step S715, the UE may encapsulate the corresponding resource in a resource set. Here, the resource set may mean resource candidates for the UE to perform resource selection.

On the contrary, when the measured value is larger than the threshold, in step S720, the UE may exclude the corresponding resource from the resource set. For example, when the measured value is larger than the threshold, the UE determines that the corresponding resource is occupied by another UE to exclude the corresponding resource from the resource selection.

In step S725, the UE may determine whether all resources existing in the interval set to the nTTI are scanned. When all the resources are not scanned, the UE returns to step S705 again to perform the previous operations repeatedly.

When the UE scans all resources, in step S730, the UE determines whether the number of sensed resources satisfies a predetermined condition. Here, the predetermined condition may mean a minimum number of resources required for the UE to perform the resource selection. The condition may be predefined on the system or configured by the eNB or the like.

In this case, when the number of sensed resources does not satisfy the predetermined condition, in step S735, the UE may adjust the threshold used in step S710. After adjusting the threshold, the corresponding UE returns to step S705 to perform the previous operations repeatedly.

When the number of sensed resources satisfies the predetermined condition, in step S740, the UE may select a resource for transmitting and receiving data (e.g., sTTI packet, nTTI packet, etc.).

In addition, although the method of using the priority described in the first embodiment and the method of using the threshold described in the second embodiment may be applied separately, the two methods may be combined and applied, of course.

For example, the above-described threshold (e.g., S-RSSI threshold, PSSCH-RSRP threshold) may be linked with the priority (e.g., PPPP value) set for the packet to be transmitted. In this case, the threshold for the sTTI packet corresponding to the same priority value may be set lower than the threshold for the nTTI packet. Here, the threshold for the nTTI packet may be a threshold when the UE measures energy during the interval set to the nTTI. In this case, a difference (i.e., offset value, bias value) between the thresholds may be set as shown in Table 4 below.

TABLE 4

| PPPP | 0 | 1 | 2 | 3 | 4 | 5 | 6 | 7 |
|---|---|---|---|---|---|---|---|---|
| nTTI | −80 | −84 | −88 | −92 | −96 | −100 | −104 | −108 |
| sTTI | −83 | −87 | −91 | −95 | −99 | −103 | −107 | −111 |

In Table 4, the unit of each threshold is dBm, and the difference between the thresholds corresponding to each priority is 3 dBm. Table 3 is just an example, and of course, the threshold may be set differently from the value shown in Table 3 according to the PPPP value.

As another example, a specific priority value (e.g., PPPP value) for the nTTI packet may be interpreted differently in the sTTI packet. Specifically, as shown in Table 5 below, a specific PPPP value for the nTTI packet may be interpreted as a lower priority for the sTTI packet.

TABLE 5

| PPPP | 0 | 1 | 2 | 3 | 4 | 5 | 6 | 7 | — | — |
|---|---|---|---|---|---|---|---|---|---|---|
| nTTI | −80 | −84 | −88 | −92 | −96 | −100 | −104 | −108 | — | — |
| PPPP | — | — | 0 | 1 | 2 | 3 | 4 | 5 | 6 | 7 |
| sTTI | — | — | −88 | −92 | −96 | −100 | −104 | −108 | −112 | −116 |

Table 5 shows one example in which a predetermined offset (e.g., PPPP value difference: 2) is applied to the PPPP value for the sTTI packet. Additional definitions as shown in Table 5 may be needed for values outside a range between the PPPP and the threshold of the nTTI packet.

Further, in various embodiments of the present invention, configuration information for the priority (e.g., PPPP value) and/or configuration information for the threshold (e.g., S-RSSI threshold, PSSCH-RSRP threshold) required for the resource selection of the UE need to be configured.

In this case, the configuration information may be predefined on the system (or standard), or may be configured by the eNB or the like without being predefined on the system. When the configuration information is configured by the eNB or the like, the configuration information may be delivered to the UE through the system information block, the higher layer signaling (e.g., RRC signaling), and/or the physical channel.

In addition, with respect to various embodiments of the present invention described above, a case in which resources reserved during a predetermined period should be reselected by a specific condition through a semi-persistent scheduling (SPS) scheme may occur.

Each time data is transmitted after the resource reselection is triggered, a counter value indicating a time for the resource reselection may decrease. In the case of V2X communication, the value of the counter may be determined to be a uniformly randomly selected value between [5, 15].

Basically, the above-described values may also be similarly transmitted for SPS transmission of the sTTI packet. However, the range of he counter value needs to be larger in order for the counter to operate for the same time (in average) as the case where the UE transmits the nTTI packet in a situation where the transmission period for the sTTI packet is shorter.

For example, a transmission period (e.g., 50 ms SPS transmission period) for the sTTI (e.g., 0.5 ms) packet may correspond to half of a transmission period (e.g., 100 ms SPS transmission period) for the nTTI (e.g., 1 ms) packet. In this case, the counter value may be set to be determined as a value uniformly randomly selected between [10, 30].

That is, when the counter value is determined by the TTI value, an initial value of the counter value may be determined as a value uniformly randomly selected in the range of $\text{ceil}(t_{nTTI}/t_{sTTI})*[5, 15]$. Further, when the counter value is determined by the transmission period, the initial value of the counter value may be determined as a value uniformly randomly selected in the range of $\text{ceil}(P_{SPS\_nTTI}/P_{SPS\_sTTI})*[5, 1]$.

Here, $t_{nTTI}$ means a TTI size (e.g., 1 ms) of the nTTI packet and $P_{SPS\_nTTI}$ means an SPS transmission period (e.g., 100 ms) of the nTTI packet. Further, here, $t_{sTTI}$ means a TTI size (e.g., 0.5 ms) of the sTTI packet and $P_{SPS\_sTTI}$ means an SPS transmission period (e.g., 50 ms) of the sTTI packet.

Each of the above-described schemes may be used selectively, or respective schemes may be used in combination. As an example, the initial value may be determined as a value equally randomly selected in the range of $\text{ceil}(t_{nTTI}/t_{sTTI})*\text{ceil}(P_{SPS\_nTTI}/P_{SPS\_sTTI})*[5, 15]$.

FIG. 8 illustrates a flowchart of an operation of a UE which performs sidelink communication in a wireless communication system to which a method proposed by this specification may be applied. FIG. 8 is just for convenience of the description and does not limit the scope of the present invention.

Referring to FIG. 8, it is assumed that the first UE supports both the sTTI and the nTTI and the second UE supports the sTTI and/or the nTTI.

In step S805, the first UE and/or the second UE may receive sidelink configuration information from the eNB. Here, the sidelink configuration information may include information on the above-described priority (e.g., PPPP value), the threshold (e.g., PSCCH-RSRP, RSSI), etc., related to transmission of the sTTI packet and/or transmission of the nTTI packet. If the above-described priority, the threshold, etc., are predefined on the system (or standard), step S805 may be omitted.

In step S810, the first UE may receive a reference signal from the second UE. For example, the reference signal may be received through the PSCCH.

In step S815, the first UE may calculate a measurement value (e.g., RSSI, RSRP, etc.) using the received reference signal. In this case, the first UE may perform monitoring according to a first transmission time interval (e.g., nTTI) in order to receive the reference signal. That is, the first UE may sense the resource(s) during the time interval corresponding to the nTTI.

In step S820, the first UE may determine whether the calculated measurement value is equal to or smaller than a predetermined threshold. Here, the predetermined threshold may be set using the ratio between a first transmission time interval (e.g., nTTI, 1 subframe) and a second transmission time interval (e.g., sTTI) supported by the first UE. In this case, the length of the second transmission time interval is shorter than the length of the first transmission time interval. As an example, the predetermined threshold may be PsTTI in Equation 1 described above.

In step S825, the first UE may transmit a signal (e.g., sTTI packet) generated according to the second transmission time interval to the second UE using a resource in which the reference signal is received when the calculated measurement value is equal to or smaller than the predetermined threshold. That is, the first UE may select a resource that satisfies a threshold condition and transmit a signal set according to the second transmission time interval to the second UE. In this case, the first UE may encapsulate the resource in the resource candidates (i.e., resource set) for transmitting the signal.

In this case, the number of BD times for receiving the reference signal may be set according to a ratio between the number of UEs of a first UE group and the number of UEs of the second UE group in a cell to which the first UE and the second UE belong. Here, the first UE group and the second UE group may be classified according to whether the UE supports the second transmission time interval. For example, a first UE group may refer to a group to which the UE (i.e., the UE capable of transmitting the sTTI packet) supporting the sTTI and the nTTI belongs and a second UE group may refer to a group to which the UE (i.e., the UE capable of transmitting only the nTTI packet) supporting the nTTI.

In addition, the method described with reference to FIG. 8 may also be applied to the case where the first UE supports only the nTTI. In this case, in step S825, the UE may transmit a signal (e.g., nTTI packet) generated according to the first transmission time interval to the second UE using a resource through which the reference signal is received.

Although the methods described in various embodiments of the present invention are described based on sidelink communication and/or V2X communication in the existing LTE system, the methods may be similarly applied to next generation wireless communication system (e.g., NR system), of course.

Overview of Devices to Which Present Invention is Applicable

FIG. 9 illustrates a block diagram of a wireless communication device to which methods proposed by this specification may be applied.

Referring to FIG. 9, a wireless communication system includes an eNB 910 and multiple UEs 910 positioned within an area of the eNB 920.

The eNB 910 includes a processor 911, a memory 912, and a radio frequency (RF) unit 913. The processor 911 implements a function, a process, and/or a method which are proposed in FIGS. 1 to 11 above. The layers of the wireless interface protocol may be implemented by the processor 911. The memory 912 is connected with the processor 911 to store various pieces of information for driving the processor 911. The RF unit 913 is connected with the processor 911 to transmit and/or receive a radio signal.

The UE 920 includes a processor 921, a memory 922, and an RF unit 923.

The processor 921 implements a function, a process, and/or a method which are proposed in FIGS. 1 to 8 above. The layers of the wireless interface protocol may be implemented by the processor 921. The memory 922 is connected with the processor 921 to store various pieces of information for driving the processor 921. The RF unit 923 is connected with the processor 921 to transmit and/or receive a radio signal.

The memories 912 and 922 may be positioned inside or outside the processors 911 and 921 and connected with the processors 911 and 921 by various well-known means.

As an example, in a wireless communication system supporting a low latency service, the UE may include a radio frequency (RF) unit for transmitting and receiving a radio signal and a processor functionally connected with the RF unit in order to transmit and receive downlink (DL) data.

Further, the base station 910 and/or the UE 920 may have a single antenna or multiple antennas.

FIG. 10 illustrates a block diagram of a communication device according to an embodiment of the present invention.

In particular, FIG. 10 is a diagram more specifically illustrating the UE of FIG. 9 above.

Referring to FIG. 10, the UE may be configured to include a processor (or a digital signal processor (DSP) 1010, an RF module (or RF unit) 1035, a power management module 1005, an antenna 1040, a battery 1055, a display 1015, a keypad 1020, a memory 1030, a subscriber identification module (SIM) card 1025 (This component is optional), a speaker 1045, and a microphone 1050. The UE may also include a single antenna or multiple antennas.

The processor 1010 implements a function, a process, and/or a method which are proposed in FIGS. 1 to 8 above. Layers of a wireless interface protocol may be implemented by the processor 1010.

The memory 1030 is connected with the processor 1010 to store information related to an operation of the processor 1010. The memory 1030 may be positioned inside or outside the processor 1010 and connected with the processor 1010 by various well-known means.

A user inputs command information such as a telephone number or the like by, for example, pressing (or touching) a button on the keypad 1020 or by voice activation using the microphone 1050. The processor 1010 receives such command information and processes to perform appropriate functions including dialing a telephone number. Operational data may be extracted from the SIM card 1025 or the memory 1030. In addition, the processor 1010 may display command information or drive information on the display 1015 for the user to recognize and for convenience.

The RF module 1035 is connected with the processor 1010 to transmit and/or receive an RF signal. The processor 1010 transfers the command information to the RF module 1035 to initiate communication, for example, to transmit wireless signals constituting voice communication data. The RF module 1035 is constituted by a receiver and a transmitter for receiving and transmitting the wireless signals. The antenna 1040 functions to transmit and receive the wireless signals. Upon receiving the wireless signals, the RF module 1035 may transfer the signal for processing by the processor 1010 and convert the signal to a baseband. The processed signal may be converted into to audible or readable information output via the speaker 1045.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

An example is primary described in which the scheme for performing the sidelink communication in the wireless communication system of the present invention is applied to the 3GPP LTE/LTE-A system, but it is possible to the scheme to various wireless communication systems in addition to the 3GPP LTE/LTE-A system.

The invention claimed is:

1. A method for performing, by a first terminal, sidelink communication in a wireless communication system, the method comprising:
   receiving a reference signal from a second terminal;
   calculating a measurement value by using the received reference signal;
   determining whether the calculated measurement value is equal to or smaller than a predetermined threshold, wherein the predetermined threshold is set by a ratio between a length of a first transmission time interval and a length of a second transmission time interval supported by the first terminal; and
   transmitting, to the second terminal, a signal generated according to the second transmission time interval by using a resource through which the reference signal is received when the calculated measurement value is equal to or smaller than the predetermined threshold,
   wherein the length of the second transmission time interval is shorter than the length of the first transmission time interval,
   wherein the predetermined threshold is set to a value acquired by subtracting a log value determined based on the ratio from a threshold configured for the second transmission time interval, and
   wherein the threshold configured for the second transmission time interval is based on a sum of a transmission power defined for the first transmission time interval.

2. The method of claim 1, wherein the reference signal is received by performing monitoring according to the first transmission time interval.

3. The method of claim 1, wherein the first transmission time interval is a time interval corresponding to one subframe, and
   wherein the second transmission time interval is a time interval shorter than one subframe.

4. The method of claim 1, further comprising:
   receiving, from a base station, sidelink configuration information including the predetermined threshold through higher layer signaling.

5. The method of claim 1, wherein when the second transmission time interval is half of the first transmission time interval, the predetermined threshold is set to be smaller than a threshold configured for the first transmission time interval by 3 dBm.

6. The method of claim 1, wherein the reference signal is received through a physical sidelink control channel.

7. The method of claim 6, wherein the measurement value is at least one of a Reference Signal Strength Indicator (RSSI) or a Reference Signal Received Power (RSRP).

8. The method of claim 1, wherein the resource is included in resource candidates for transmission of the signal.

9. The method of claim 1, wherein a number of blind decoding times for receiving the reference signal is set according to a ratio between a number of terminals of a first terminal group and a number of terminals of a second terminal group in a cell to which the first terminal and the second terminal belong, and
   wherein a terminal that belongs to the first terminal group supports the first transmission time interval and the second transmission time interval,
   wherein a terminal that belongs to the second terminal group supports the first transmission time interval,
   wherein the first terminal belongs to the first terminal group and,
   wherein the second terminal belongs to the first terminal group or the second terminal group.

10. A first terminal for performing sidelink communication in a wireless communication system, the first terminal comprising:
   a transceiver for transmitting and receiving a radio signal; and
   a processor functionally connected to the transceiver,
   wherein the processor is configured to:
   receive a reference signal from a second terminal,
   calculate a measurement value by using the received reference signal,
   determine whether the calculated measurement value is equal to or smaller than a predetermined threshold, wherein the predetermined threshold is set by a ratio between a length of a first transmission time interval and a length of a second transmission time interval supported by the first terminal,
   transmit, to the second terminal, a signal generated according to the second transmission time interval by using a resource through which the reference signal is received when the calculated measurement value is equal to or smaller than the predetermined threshold, and
   wherein the length of the second transmission time interval is shorter than the length of the first transmission time interval,
   wherein the predetermined threshold is set to a value acquired by subtracting a log value determined based on the ratio from a threshold configured for the second transmission time interval, and
   wherein the threshold configured for the second transmission time interval is based on a sum of a transmission power defined for the first transmission time interval.

* * * * *